United States Patent [19]

Boggio et al.

[11] 4,434,324
[45] Feb. 28, 1984

[54] REVERSAL OF CONNECTIONS OF TELEGRAPHIC LINE WIRES UPON DETECTION OF UNWANTED POLARITY OF THE LOOP CURRENT

[75] Inventors: Giuseppe Boggio, Rivarolo; Mario Lorenzi, Ivrea, both of Italy

[73] Assignee: Ing. C. Olivetti & C., S.p.A., Ivrea, Italy

[21] Appl. No.: 343,311

[22] Filed: Jan. 27, 1982

[30] Foreign Application Priority Data

Jan. 30, 1981 [IT] Italy ............................. 67122 A/81

[51] Int. Cl.³ ........................................... H04L 25/02
[52] U.S. Cl. ................................... 178/69 R; 178/16; 178/69 G; 178/63 F
[58] Field of Search ............... 178/69 R, 16, 3, 69 G, 178/63 F; 371/57, 60, 20

[56] References Cited

U.S. PATENT DOCUMENTS 3,458,727 7/1969 Watkins ........................... 178/16 X Primary Examiner—Stafford D. Schreyer
Attorney, Agent, or Firm—Schuyler, Banner, Birch, McKie & Beckett

[57] ABSTRACT

The system comprises at least one teleprinter station (1) connected to an exchange (3) by means of a transmission-reception line (2) and comprising a polarity detector (31) for the line circulating current, and a device (30) for reversing the connection of the line wires. If the wires erroneously become reversely connected following maintenance work on a line of single current type, then false call and conversation signals are generated which automatically trigger a checking operation in which the polarity detector is suitably examined under control of a ROM routine E controlling a CPU 84. If the current is found to be the reverse of the correct current, the reversing device is operated in order to reverse the polarity of the connection. In contrast, in the case of a double current line, the reversing device is operated when current is absent in the reception line, thus indicating an erroneous line connection. If the line current interruption is prolonged, a warning device (28) is activated.

10 Claims, 8 Drawing Figures

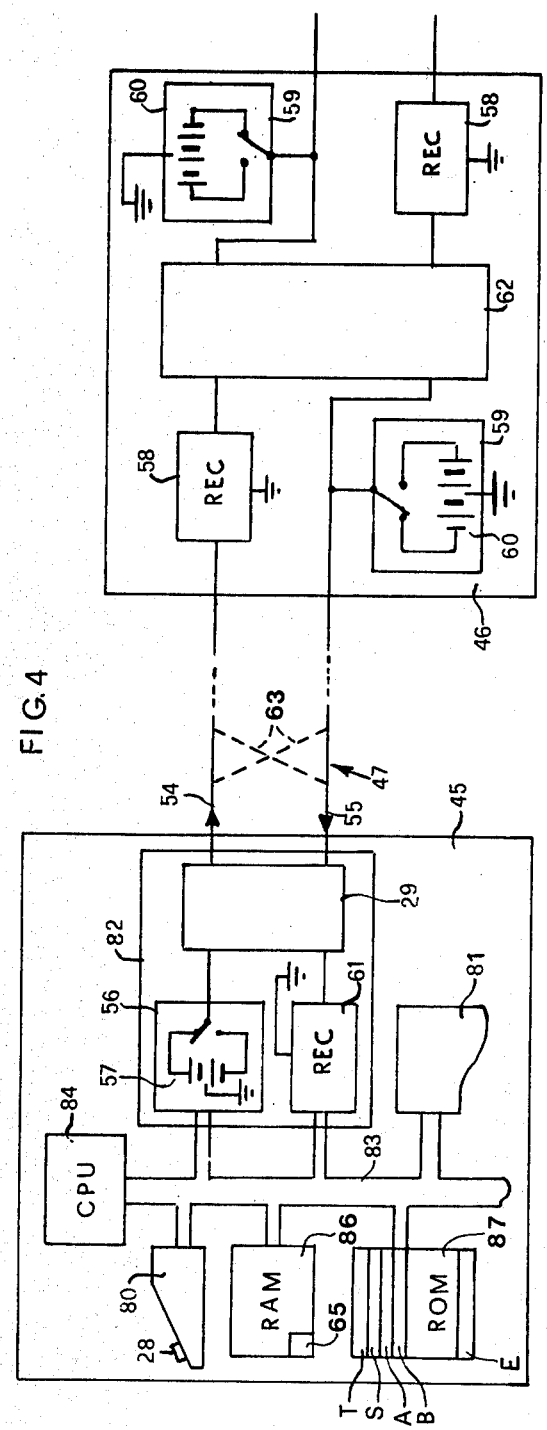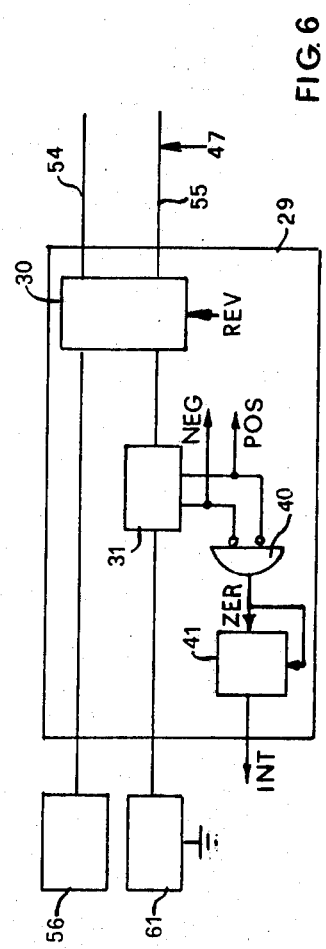
FIG. 4
FIG. 6

4,434,324

REVERSAL OF CONNECTIONS OF TELEGRAPHIC LINE WIRES UPON DETECTION OF UNWANTED POLARITY OF THE LOOP CURRENT

BACKGROUND OF THE INVENTION

This invention relates to a telegraphic communication system with automatic handling of connection irregularities in the transmission-reception line of a telegraphic station, the line normally carrying a predetermined current, comprising a polarity detector connected in series with the line to detect the polarity of the circulating current, and a device for reversing the connection of the line.

There are two commonly used line circuits which normally carry an idling current. One is a unipolar circuit providing a single current loop for transmission and reception and which is called a single current system herein. The other is a bipolar circuit with separate current loops for transmission and reception and which is called a double current system herein.

In known single current teleprinter systems, any absence of the idling current for a certain time, followed by a current which is the reverse of the idling current, is interpreted as an erroneous line connection following maintenance work on the line. This situation is detected by a circuit in the teleprinter which after a predetermined time period automatically switches over the polarity of the line connections, in order to re-establish the correct direction of current circulation.

If the line reversal is carried out very rapidly, for example by switching a pin in the exchange, the circuit in question is unable to discriminate the polarity reversal.

SUMMARY OF THE INVENTION

The object of the invention is to provide a telegraphic communication system in which erroneous polarity reversal can be positively discriminated both in a single current system and in a double current system. According to the invention it is now provided a telegraphic communication system with automatic handling of irregularities in the connection of a transmission-reception line of a telegraphic station, the line normally carrying a predetermined current, the system comprising a polarity detector in series with the line to detect the current polarity, a device for reversing the connection of the line, and checking means operating in dependence upon the detector, for carrying out a check on the polarity of the current in order to cause the reversing device to operate if the result of this check is negative.

BRIEF DESCRIPTION OF THE DRAWINGS

The invention will be described in more detail, by way of example, with reference to the accompanying drawings, in which:

FIG. 4 is a diagrammatic representation of a double current telegraphic communication system;

FIG. 6 is an electrical circuit diagram of the polarity detecting and reversing circuit of the teleprinter of the system of FIG. 4;

DESCRIPTION OF THE PREFERRED EMBODIMENTS

Figures 1, 3:
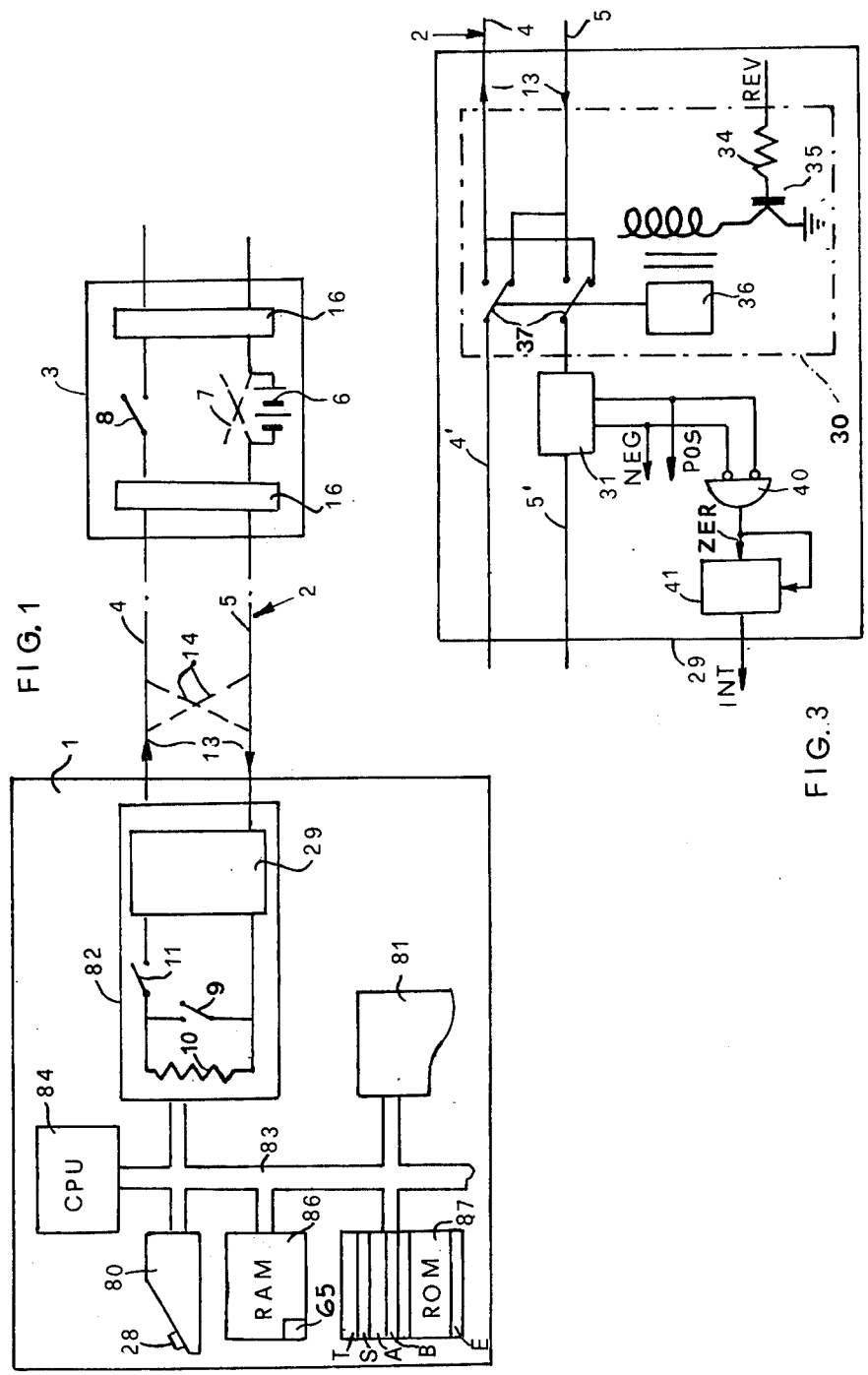
FIG. 1 is a diagrammatic representation of a single current telegraphic communication system.
FIG. 3 is an electrical circuit diagram of a polarity detecting and reversing circuit of the teleprinter of the system of FIG. 1.

With reference to FIG. 1, a single current telegraphic communication system comprises an electronic teleprinter 1 connected by a two-wire line 2 to an exchange 3. The teleprinter 1 comprises essentially a keyboard 80, a printer 81 and a line interface 82, which are connected by way of a bus 83 to a central unit (CPU) 84. This is of the microprocessor type, and cooperates by way of the bus 83 with a working RAM 86 under the control of a ROM 87 permanently storing a series of microprograms or instruction routines, T, S, A, B etc., known as handlers.

In the interface 82 of the teleprinter 1, the functions of the teleprinter 1 are controlled both in reception and in transmission by the CPU 84 which processes the microprograms contained in the memory 87 substantially in the manner described in our published United Kingdom patent application No GB 2078062.

The line 2 is of the "single current" type, composed of only two wires 4 and 5, through which a current circulates, modulated as required, for reception or for transmission. The current is circulated in the line 2 by a generator 6 in the exchange 3 (represented as a battery), to selectively provide a positive voltage at the wire 4 and a negative voltage at the wire 5 or vice versa, as shown diagrammatically by an arrangement of connections 7. A switch 8 in the exchange 3 diagrammatically indicates the possibility of modulating the current circulating in the line 2 in order to feed messages from the exchange 6 to the teleprinter 1. The generator 6 and switch 8 are connected to the line 2 of each teleprinter 1 by a corresponding connection circuit 16, of which only two are shown in FIG. 1. It is therefore possible to connect together any two teleprinters 1 by way of the exchange 3.

In the line interface 82, a switch 11 indicates a signal modulation member for feeding messages from the teleprinter 1 to the exchange 3. A switch 9 selectively shunts a resistor 10 in series with the wires 4 and 5, in order to select currents of the value of 40 mA representing the transmitted signals when the switch 9 is closed, and currents of 5 mA representing idling signals when the switch 9 is open. The current signals used for transmitting messages from or towards the teleprinter 1 are the 40 mA signals.

The teleprinter 1 comprises means arranged to generate a signal FINC in known manner to indicate the termination of a transmission-reception operation. This termination signal is generated on the basis of a command from the CPU processor 84 either at the end of a message transmitted by the teleprinter 1, or following an end-of-transmission signal originating from the exchange 3.

It is obvious that the switches 8, 9, 11 and resistor 10 as means for establishing the current levels and modulation in the line 2 only represents a simplification of the devices of the system, for the purposes of the present description. For a more complete description of the teleprinter reference should be made to the aforementioned published application GB No. 2078062. A detailed description is there given with reference to FIG. 2, of the operation of a processor which controls the operation of the line interface 82 connected to a line 2 by processing the microprograms contained in the ROM 87. More specifically, modulation of the line currents, indicated symbolically in the present description by the resistor 10 and by the switches 9 and 11, is carried out in well known manner by two optoelectric couplers controlled by the processor 84 by way of a pilot circuit. The end-of-transmission signal FINC is generated by a code present in a signal channel 83 and generated locally by the keyboard 80 or fed from the exchange 3, as will be more apparent hereinafter.

When there is no transmission in the system of FIG. 1, the switch 9 is open and the switches 8 and 11 are closed, while the generator 6 is connected in such a manner as to supply a negative voltage to the wire 4, so that when transmission is absent an idling current circulates through the line 2 in the opposite direction to that assumed as positive and indicated by a pair of arrrows 13. This idling current is limited by the resistors 10 to −5 mA. Circulation of a positive current of +5 mA through the line 2 and resistor 10 is determined by reversing the connections 7.

Figure 2:
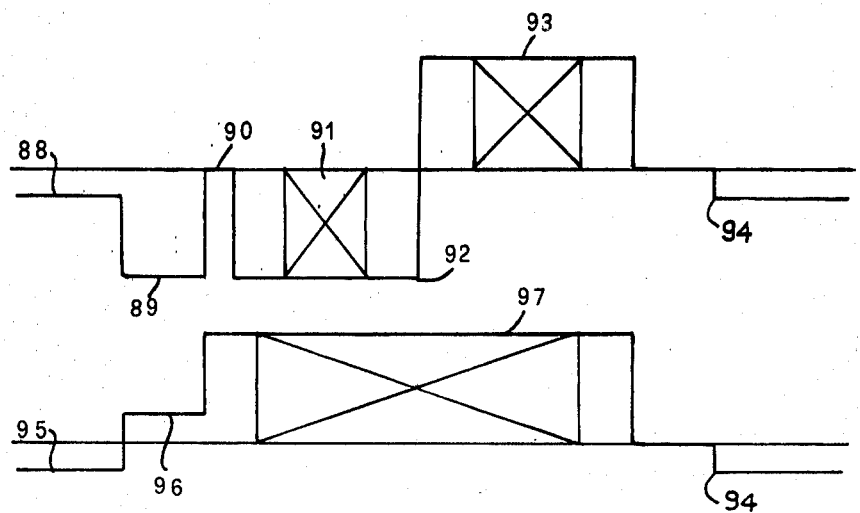
FIG. 2 shows diagrams of the currents in a single current line.
Figure 2:
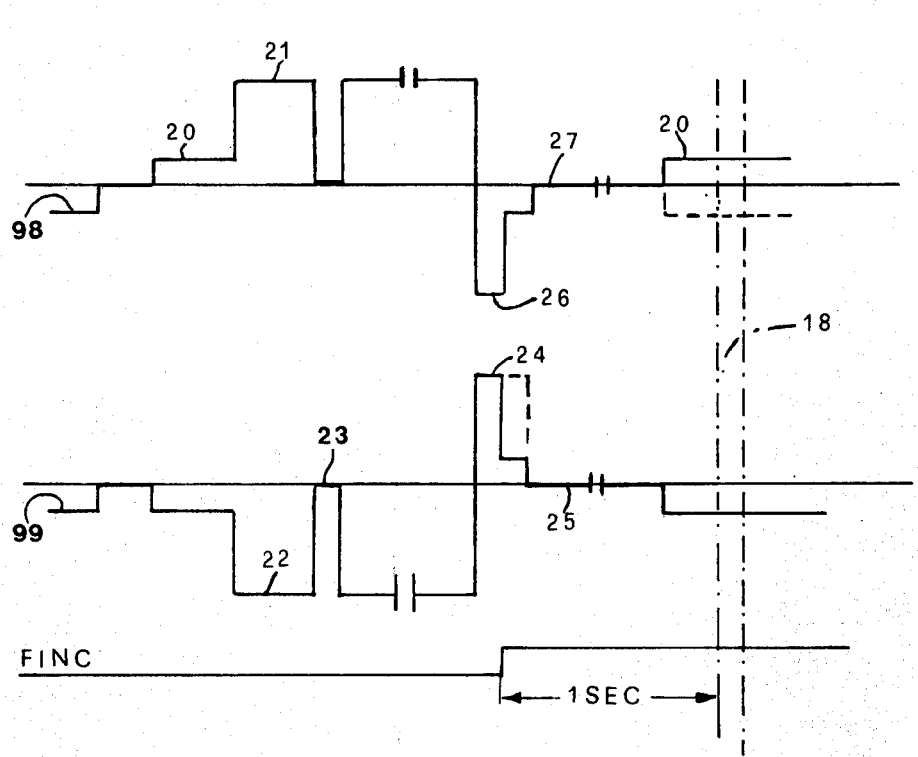

With reference to FIG. 2, the diagram 88 represents a connection made as the result of a call signal originating from the teleprinter 1. The call begins with the closure of the switch 9, which generates a signal 89 of −40 mA, to which the exchange 3 replies by opening the switch 8 in order to generate a current interruption 90 which represents a request to the teleprinter 1 to dial the distant station. The dialling operation is indicated in the diagram by a series of signals 91. The connection having been made at 92, the exchange 3 reverses the connection of the generator 6 by way of the connections 7, so that the message is transmitted with a sequence of +40 mA signals 93. On termination of the message, an end-of-message code is transmitted by the teleprinter, which causes the CPU 84 to emit a FINC signal, causing the switch 11 to open. In response to the end-of-message code, the exchange 3 makes a new reversal of the connections 7 with a predetermined delay, so that circulation of the idling current of −5 mA is restored at 94.

The teleprinter 1 can also be connected by a call signal originating from the exchange and thus entering the teleprinter. In this case, represented by the diagram 95 in FIG. 2, the exchange 3 commences with a reversal of the connections 7, to induce the call signal 96 of +5 mA in the line. After a predetermined waiting period, generally 100 msec, the teleprinter 1 recognizes the call signal and closes the switch 9, so that the message becomes transmitted by means of a sequence of +40 mA signals 97. On termination of the message, the exchange 3 transmits the end-of-message code, causing the teleprinter switch 11 to open, and restores the −5 mA current by way of the connections 7, as in the preceding case.

If following an outgoing call signal, no dialling is carried out after the signal 90 transmitted by the exchange 3, the exchange 3 transmits the end-of-message code after a predetermined period in all cases, and the connection is called a "false connection". The aforesaid connection procedures are known and are schedule by international regulations, so that they require no further description.

If following maintenance work or some other event the wires 4 and 5 of the line 2 become accidentally connected in a reverse manner, as indicated by the dashed lines 14 in FIG. 1, the current circulating through the line 2 becomes reversed and the teleprinter 1 receives a signal of +5 mA. This signal is indicated at 20 on a corresponding diagram 98 of FIG. 2. The teleprinter then interprets the signal 20 as a call by the exchange 3 (see signal 96), so that it closes the switch 9 in order to generate a current of +40 mA. This generates a signal 21 representing recognition of the connection requested by the exchange 3.

Because of the polarity reversal 14, the currents circulating through the exchange 3 are now of opposite polarity to those circulating through the teleprinter 1, as indicated by the diagram 99 of FIG. 2, so that to the signal 21 there now corresponds a signal 22 which the exchange interprets however as a call by the teleprinter 1 (see signal 89). The exchange 3 thus transmits a current interruption 23 while awaiting the dialing operation, whereas the teleprinter interprets this interruption as part of the message being received.

However, because of the fact that the teleprinter 1 does not carry out any dialling and does not transmit messages, after the predetermined period the exchange 3 transmits the end-of-operation code which begins with a positive signal 24. This is received by the teleprinter as a negative signal 26, in response to which the CUP 84 generates the signal FINC, causing the switch 11 to open as at the end of a regular transmission.

The current due to the signal 24 now falls temporarily to +5 mA in the exchange 3, and to −5 mA in the teleprinter 1. After the predetermined delay, the exchange 3 again reverses the connections 7, so that the signal 20 is restored together with the initial conditions, which again determine circulation of a current of +5 mA (full line) instead of the regular current of −5 mA (indicated by the dashed line). The false connection operations now described are therefore repeated, unless any external intervention takes place.

It is therefore apparent that any accidental reversal of the line 2 always indicates false transmission signals followed by signals indicating the end of the transmission, analogous to those relative to normal transmissions.

To obviate this drawback, the teleprinter station 1 (FIG. 1) is provided with a device 29 for automatically handling connections irregularities, comprising a device 30 (FIG. 3) for reversing the connection of the two wires 4 and 5, which is connected in series with the line 2, and a current polarity detector 31 connected in series with the wire 5. The teleprinter 1 also comprises an alarm device constituted by a warning light 28 disposed on the keyboard 80 and arranged to light intermittently under the control of the CPU 84 when certain abnormal conditions occur, as will be more apparent hereinafter. Alternatively, the alarm device can be a buzzer or other acoustic device. The reversing device 30 is controlled by a reversing signal REV activated by the CPU processor 84 of FIG. 1. The signal REV, when activated, energises an electromagnet 36 by way of a resistor 34 and transistor 35, this electromagnet changing-over a two-pole changeover switch 37 from a first to a second position. When in its first position, the switch 37 connects the wire 4 to the wire 4' and the wire 5 to the wire 5', while when in its second position it connects the wire 4 to the wire 5' and the wire 5 to the wire 4', so reversing the polarity of the current circulating through the line 2 within the teleprinter.

The polarity detector 31 comprises at least one optoelectric coupler, and is connected in series with the line 2 in the manner described in our UK patent specification GB No. 1 575 326.

The detector 31 provides two signals NEG and POS continuously, at logic levels depending on the direction of the circulating current in the line 2. When the circulating current has a positive direction (indicated by the arrows 13), the signal NEG is low while the signal POS is high. If the current circulating through the line 2 has a negative direction, the signal POS is low and the signal NEG is high, whereas if current is absent both the signals POS and NEG are low.

The signals NEG and POS at low logic level activate a signal ZER at the input to a timing counter 41 by way of an AND gate 40. The counter 41 is set to run when ZER is high to provide an output signal INT after a period of 5 seconds. The signal INT is thus set to the high logic level "1" only if current is absent from the line for an interval of at least 5 seconds. When the current in the line 2 again begins to circulate, the signal ZER returns to low logic level, and its negative transition deactivates the counter 41 and resets it to "0". Obviously, if the current interruption is less than 5 seconds, the signal INT cannot be activated because the counter 41 becomes deactivated before this, so that the signal INT thus generated indictes that current has not been circulating through the wire 5 for at least 5 seconds.

The signals NEG, POS and INT are used by the CPU 84 in the manner described hereinafter.

If a teleprinter 45 (FIG. 4) is connected to an exchange 46 by a "double current" line 47, the two wires 54 and 55 which comprise the line 47 are electrically independent and serve for transmitting messages from the teleprinter 45 to the exchange 46 and for receiving at the teleprinter 45 from the exchange 46 respectively, both wires operating in conjunction with a common earth return.

More specifically, the teleprinter 45 is provided with a keyboard 80 with an alarm device 28, a printer 81, a CPU 84 and memories 86 and 87, corresponding to those of the teleprinter 1 of FIG. 1.

The line interface 82 of the teleprinter 45 (FIG. 4) likewise comprises a device 29 for automatically handling connection irregularities. However, the interface 82 of the teleprinter 45 now comprises a transmission device 56 indicated diagrammatically by means of a current generator 57 able to feed a current of ±20 mA through the wire 54. The current through the line 47 is modulated between the two levels +20 mA and −20 mA in order to transmit messages through the wire 54 to a corresponding reception device 58 disposed in the exchange 46.

Likewise, a transmission device 59 disposed in the exchange 46 and indicated diagrammatically by means of a current generator 60 is associated with the teleprinter 45, and feeds currents through the wire 55 to a reception device 61 in the teleprinter 45. The exchange 46 thus comprises one transmission device 59 and one reception device 58 for each teleprinter 45, a known selection unit 62 being actuated by the dialling operation in order to connect two teleprinters 45 together.

Figure 5:
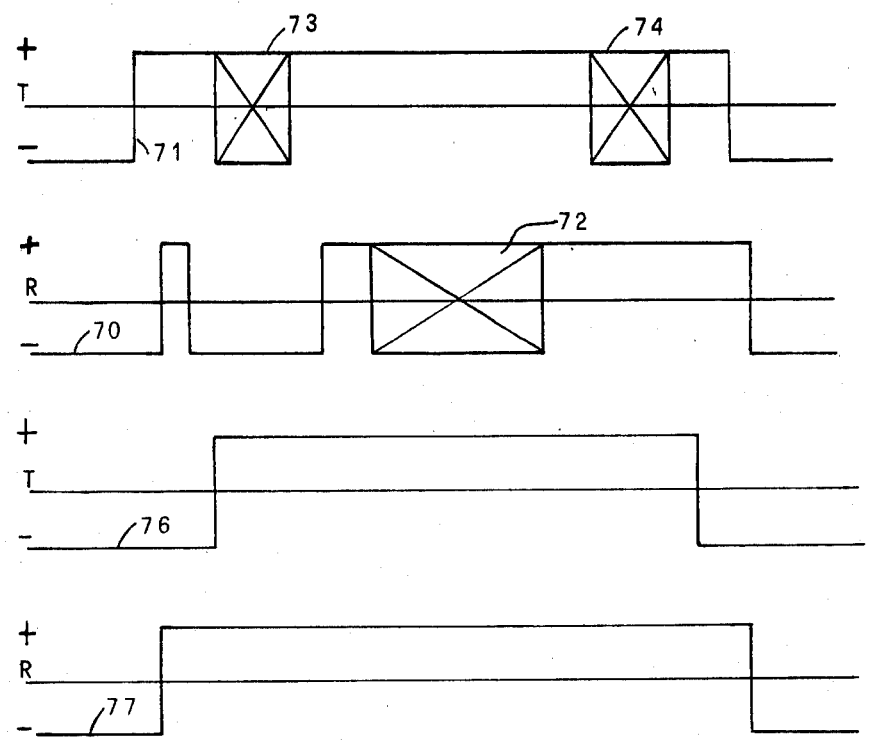
FIG. 5 is a diagram of the current levels in double current transmission.

The transmission and reception devices of the teleprinter 45 for double current operation are controlled by the CPU 84, which processes the programs contained in the memory 87. FIG. 5 shows two current levels of −20 and +20 mA during the idling stage and during a transmission respectively. The diagram 70 represents the current through the reception wire 55 for a connection made from the teleprinter 45, and is analogous to the diagram 88 (FIG. 2). The zone 72 indicates the modulation during the reception.

The diagram 71 indicates the current through the transmission wire 54 as a result of the outgoing call, in which the zone 73 represents the dialling and the zone 74 represents the modulation during the transmission. The diagrams 76 and 77 represent the currents for a call entering the teleprinter through the transmission wire 54 and reception wire 55. It is therefore apparent that the current circulating through the wire 54 or wire 55 is never zero.

In the case of the teleprinter 45 operating with double current, the device 29 is again disposed with the reversing device 30 (FIG. 6) in series with the transmission wire 54 and reception wire 55, in such a manner as to be able to reverse their connections to the teleprinter, while the polarity detector 31 is connected in series with the reception wire 55 to detect the absence of current which occurs if the two reception devices 58 and 61 of FIG. 4 are erroneously connected together.

A description will now be given, with reference to FIG. 7, of the operation of the device 29 under the control of the microprogram stored in the ROM 87 and processed by the CPU 84 in order to control the teleprinter 1 or 45 in the case of line connection irregularities, both with single current operation and with double current operation. For this purpose, the CPU 84 of the teleprinter 1, 46 effects checking operations which cause the detector 31 to carry out a check on the current polarity. More sepcifically, these checking operations are activated in a predetermined sequence controlled by a routine E recorded on the ROM 87, and which will be described in greater detail hereinafter. In addition, in the RAM 86, a memory element or cell 65 is arranged to store a signal called FLAG, to indicate particular connection situations.

At four points of the routine E of the program in question, four selections 100, 101, 102 and 103, referred to as "LINE", differentiate the handling of a single current line, the result being "CS", from a double current line, the result being "CD".

Figure 7:
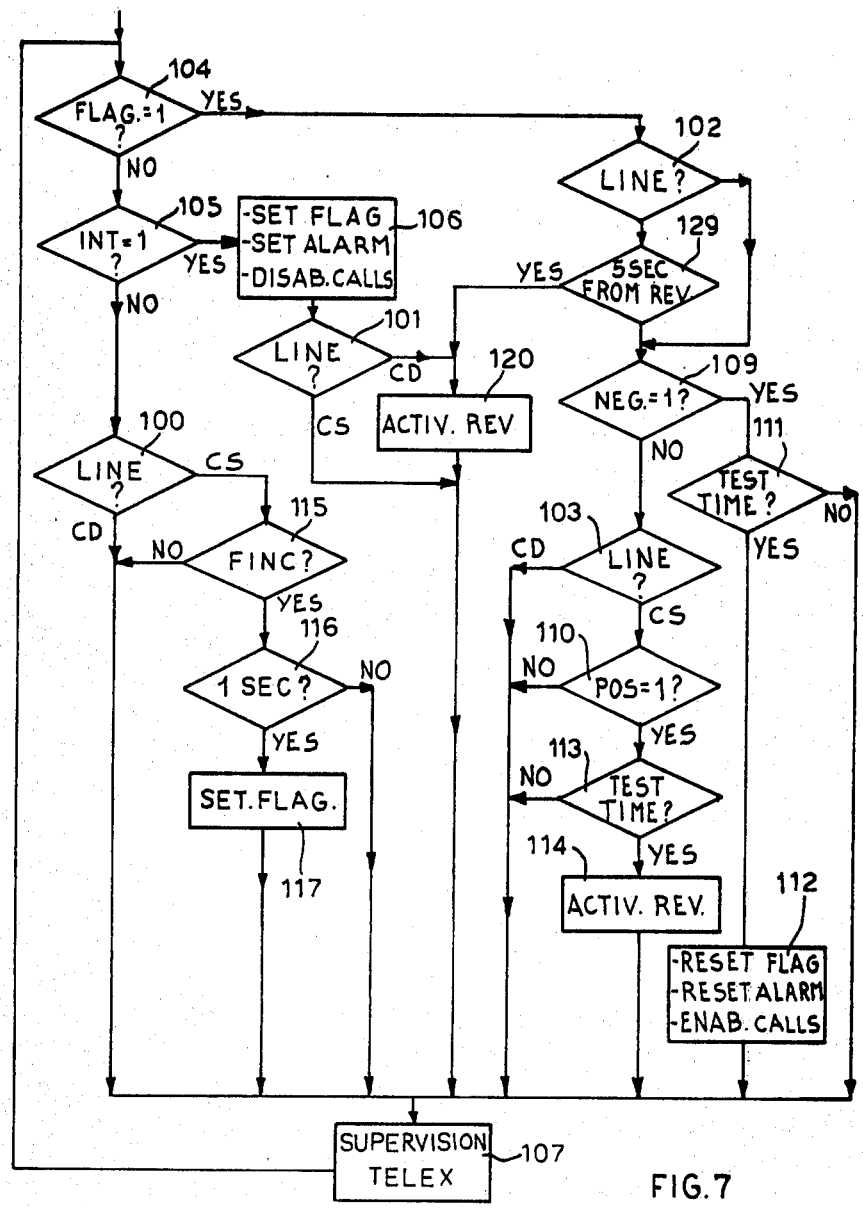
FIG. 7 is a flow chart of a microprogram for the teleprinter of FIG. 1 or FIG. 4.

On installing the teleprinter, or when the type of connection is chosen, it is necessary only to program a cell of the ROM 87 or operate a switch (not shown) to determine in known manner the result CS or the result CD of the selections 100–103 of the program of FIG. 7.

The case of single current operation will be examined first. The selection 104 checks the FLAG condition stored in the cell 65 of the memory 86. This condition indicates the need to check the circulating current through the line 2 if at logic level "1", whereas it allows execution of other programs if at logic level "0".

If the logic level of FLAG is 0, a selection 105 follows, indicating an examination of the signal INT, FIG. 3, which at logic level 1 indicates an interruption of the circulating current through the line 2 lasting greater than 5 seconds. If INT=1, this is considered an abnormal condition, as a result of which predetermined automatic control or reversal operations on the line 2 must be carried out. If INT=1, the operations 106 thus follow, by means of which FLAG is set to "1", an alarm signal is activated to light the lamp 28 located on the keyboard or the acoustic signal, and any cells originating from the exchange 3 are deactivated in known manner.

As this is the single current case, the selection 101 of FIG. 7 is followed directly by a block 107, which generally indicates the execution of control programs for supervising the teleprinter 1. These programmes can be processes by the CPU 82, either to locally control the teleprinter 1 and possibly its peripherals, or to control the line. Obviously, as the cell has been deactivated, only local control is allowed.

The block 107 is followed by the selection 104, which following the operation 106 now has a positive result. The selection 102 is then made, and as the operation is of single current type, the selections 109, 103 and 110 are made in sequence. The selections 109 and 110 indicate examination of the signals NEG and POS respectively from the polarity detector 31 of FIG. 3, so that these represent the checks on the line circulation current. In the case of interruption of the line 2, the signals NEG and POS both remain at logic level "0", and consequently the selection 109 and the selection 110 have a negative result, and a return is made to local control as represented by the block 107. The block 107 is again followed by the selection 104 with positive result. Consequently, if the line interruption remains, the line checking operations 102–110 are repeated, with the alarm situations as listed in the block 106 maintained.

Figure 8:
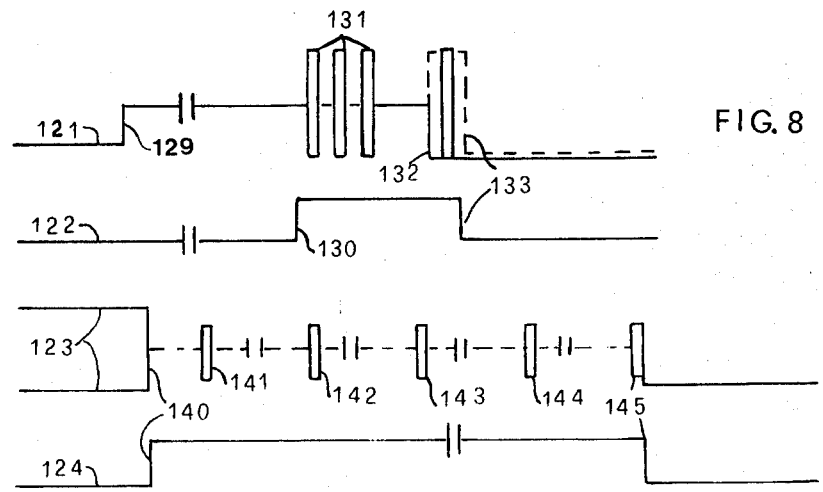
FIG. 8 represents the test and indication diagrams for the teleprinters of FIGS. 1 and 4.

In the diagram 121 of FIG. 8, the instant 129 indicates the cessation of the idling current following an interruption in the line 2. 5 seconds after the execution of the operations 106 of FIG. 7, defined by the counter 41 (FIG. 3), the alarm signal is activated as indicated at the instant 130 on the diagram 122 of FIG. 8. Repeated polarity checking operations 131 then take place, while the alarm situation remains.

When the interruption conditions in the line 2 disappear, two conditions can occur, either the correct restoration of the connections to determine the idling current of −5 mA, or the erroneous reversal of these connections to determine a circulating current of +5 mA.

In the case of correct restoration, the selection 109 of FIG. 7 has a positive result. In this case, a test waiting time of the order of 100 msec. produces a negative result for the selection 111, which is followed by the operations 107–109 and thus the repetition of the current polarity checks, possibly interspersed by other local control operations 107, until the test time has run out. After this time, a group of operations 112 is carried out in which FLAG is set to "0", the alarm 28 is turned off and the cell signals are again authorized. On the diagram 121 of FIG. 8, the correct restoration is represented by the continuous line at the instant 132, which is followed by the test at the instant 133. As the result of this test is assumed positive, the alarm reset is produced, visible in the diagram 121.

However, if reversed connection of the line 2 occurs after the interruption, there is a current of +5 mA indicated by a dashed line at the instant 132. This current sets the signal NEG of FIG. 3 to logic level "0" and the signal POS to logic level "1". In a like manner to the preceding case, in FIG. 7, the signal POS is then examined (selection 110) repeatedly together with other operations (107) until the test time controlled by the selection 113 runs out.

When the result of the selection 113 becomes positive, operation 114 is carried out, representing the reversing command actuated by the signal REV (FIG. 3), which is fed to the input of the polarity reversing device 30 to produce reversal of the connections of the line 2. At this point, the correct idling current of −5 mA must circulate through the line, and this, checked once again by the selection 109 (FIG. 7) produces execution of the operations 112, and the teleprinter returns to normal operation. FIG. 8 shows the polarity reversal by means of the dashed line 133 produced after the last test.

If the signal INT is at low logic level with a negative result of the selection 105, there has been no interruption in the line 2 of sufficiently high duration. It is however possible that a reversal of the connections has equally taken place, to determine false transmission-reception operation between the teleprinter 1 and exchange 3 described with reference to FIG. 2. The selection 105 (FIG. 7) is now followed by the selection 100 and by the selection 100 and by a selection 115 dependent on the end-of-transmission signal FINC. After a delay of about 1 second (waiting time 116), the selection 115 again determines activation of the FLAG at logic level "1" (operation 117). This means that the test indicated at point 118 follows each activation of the end-of-transmission signal FINC (FIG. 2) with the said delay (necessary to allow any transient phenomena to die out), to check the direction of the current under idling conditions. This is then followed by the block 107 (FIG. 7) and the selection 104 with positive result, which produces the tests and any line reversals described by the blocks 109–114.

The case of double current operation will now be examined. Any interruption indicated by the signal INT=1, selection 105, now refers only to the reception wire 55 of FIG. 6. This is followed as in the case of single current by the operations of the block 106 of FIG. 7, but following the selection 101 an operation 120 is carried out which immediately causes the reversal of the connections of the lines 54 and 55 of FIG. 6. As the FLAG is now at logic level "1", after the selection 102 a selection 129 is made to indicate if 5 seconds have passed from the reversal of polarity. While this time is passing, checks are made to determine whether the reversal produced by the operation 120 has generated the correct idling current (−20 mA) in the wire 55 of FIG. 6 (operations 109 and 111). If this is the case, then normal operating conditions of the teleprinter 1 are restored by the operation 112, as in the case of single current operation.

However, if the selection 109 gives a negative result, this is due to the fact that the correct current has not yet been established in the wire 55. In this case, the selections 103, 107, 104 and 102 follow, and the checks on the current flowing through the wire 55 of FIG. 6 are repeated. Afte 5 seconds, the result of the selection 129 is positive, the line reversal 102 is again actuated, and the operations 107 and 104 are repeated until negative current is restored in the wire 55.

The effect of this succession of operations carried out in the case of double current is clearly to reverse the connections every 5 seconds until the normal idling current is restored, while the current levels are cyclically re-examined between one reversal and the next.

The diagram 123 of FIG. 8 schematically shows the interruption of the current in the line 47 at an instant 140, while the diagram 124 schematically shows the alarm indication. At an immediately subsequent instant 141 the first line reversal operation takes place, followed by other reversals 142, 143 and 144 separated by periods of 5 seconds. It has been assumed that the reversals 141–144 have no effect on the line current. At an instant 145, following a further reversal, the correct idling current returns, and the alarm conditions are obviously reset.

Various modifications can be made to the described system without leaving the scope of the invention. For example, the teleprinter stations can be connected by so-called point-to-point lines. As the current indications are analogous to those already examined, the automatic handling of the transmission-reception irregularities can be easily deduced from the description already given. Moreover, this handling can apply to irregularities in connection types which are different from that described.

We claim:

1. A telegraphic communication system with automatic handling of irregularities in the connection of a transmission-reception line of a telegraphic station, the line normally carrying a predetermined current, comprising a polarity detector (31) in series with the line to detect the current polarity, and a device for reversing the connection of the line (30), characterized by checking means (84) operating in dependence upon the detector (31), for carrying out a check on the polarity of the current in order to cause the reversing device (30) to operate if the result of this check is negative.

2. A system as claimed in claim 1, characterised by sensing means (40, 41) responsive to the polarity detector (31), for sensing an absence of circulating current in the line for a time period exceeding a predetermined period, the checking means (84) also being dependent on the sensing means, in order also to cause the reversing device (30) to operate if a connection reversal takes place during the current absence.

3. A system as claimed in claim 2, in which the telegraphic station comprises a central unit controlled by a memory permanently storing a set of instruction routines, characterized in that the checking means comprise the central unit (84) programmed by one of the instruction routines (E) to cause in predetermined sequence said detector (31) and said sensing means (40,41) to examine the current in said line, and to command activation of the reversing device (30) in dependence upon the results of such examinations.

4. A system as claimed in claim 3, characterised in that the central unit (84) is arranged to control the setting of a memory element (FLAG) indicating a situation in which a check on the line current is required, and to operate an alarm device (28).

5. A system as claimed in claim 2, in which the line is a single current line, and comprising end-of-operation means arranged to indicate the end of a reception-transmission operation, characterised in that following an accidental line reversal, the telegraphic station (1) is arranged to initiate a false transmission-reception operation arranged to activate the end-of-operation means, said checking means being also dependent on said end-of-operation means, so that the reversing device (30) is operated on termination of the false operation.

6. A system as claimed in claim 5, in which the line is constituted by two wires carrying the predetermined current, characterised in that the detector (31) is arranged to generate two signals, one of which (POS) indicates one polarity of the predetermined current, while the other (NEG) indicates the opposite polarity, the sensing means (40, 41) being dependent on the absence of both these signals.

7. A system as claimed in claim 6, characterised in that the central unit (84) initially causes examination of the first of the two signals (NEG) in order to reset the memory element (FLAG) if the result is positive, whereas if the result is negative the central unit causes examination of the second of the signals (POS) and, if the result is then positive, generates the command for the reversing operation.

8. A system as claimed in claim 2, in which the line is a double current line and comprises two separate wires, one for transmission and the other for reception, so that a reversed line connection nullifies the current normally circulating through the reception wire, characterised in that the polarity detector (31) is connected in series with the reception wire (55) to check the absence of circulating current, and the reversing device (30) is connected in series with both the line wires (54, 55), the reversing device being caused to operate in response to the absence of current for the said time period.

9. A system as claimed in claim 8, in which the telegraphic station comprises a central unit controlled by a memory permanently storing a set of instruction routines, characterised in that the central unit (84) cyclically controls the reversing means (30) during the absence of current at time intervals equal to the said time period, so that the line connection becomes repeatedly reversed.

10. A system as claimed in claim 9, characterised in that the central unit (84) controls the checking in such a manner as to carry out a further check after each command fed to the reversing device (30).

* * * * *